(12) United States Patent
Luo et al.

(10) Patent No.: US 10,435,310 B2
(45) Date of Patent: Oct. 8, 2019

(54) PROCESS FOR SEPARATE REMOVAL AND RECOVERY OF HEAVY METALS FROM INDUSTRIAL WASTEWATER

(71) Applicant: NANCHANG HANGKONG UNIVERSITY, Nanchang, Jiangxi Province (CN)

(72) Inventors: Xubiao Luo, Nanchang (CN); Kai Zhang, Nanchang (CN); Xiao Xiao, Nanchang (CN); Weili Dai, Nanchang (CN); Shenglian Luo, Nanchang (CN)

(73) Assignee: NANCHANG HANGKONG UNIVERSITY, Nanchang (CN)

( * ) Notice: Subject to any disclaimer, the term of this patent is extended or adjusted under 35 U.S.C. 154(b) by 162 days.

(21) Appl. No.: 15/672,367

(22) Filed: Aug. 9, 2017

(65) Prior Publication Data

US 2018/0050931 A1 Feb. 22, 2018

(30) Foreign Application Priority Data

Aug. 16, 2016 (CN) .......................... 2016 1 0674248

(51) Int. Cl.
*C02F 1/28* (2006.01)
*B01J 20/26* (2006.01)
*B01J 20/34* (2006.01)
*C02F 1/66* (2006.01)
*C02F 101/20* (2006.01)

(52) U.S. Cl.
CPC ............... *C02F 1/285* (2013.01); *B01J 20/26* (2013.01); *B01J 20/268* (2013.01); *B01J 20/3425* (2013.01); *B01J 20/3475* (2013.01); *C02F 1/66* (2013.01); *C02F 2101/20* (2013.01)

(58) Field of Classification Search
CPC .... C02F 1/285; C02F 1/66; C02F 9/00; C02F 2101/20; C02F 2101/22; B01J 20/26; B01J 20/268; B01J 20/3057; B01J 20/3425; B01J 20/3475
See application file for complete search history.

(56) References Cited

U.S. PATENT DOCUMENTS

2008/0221248 A1* 9/2008 Kim .......................... B01J 20/26 524/297
2013/0161260 A1* 6/2013 Ferguson .................. G21F 9/06 210/682

FOREIGN PATENT DOCUMENTS

WO WO-2014188158 A1 * 11/2014 ............ B01J 20/268

OTHER PUBLICATIONS

Hande et al, Highly selective monitoring of metals by using ion-imprinted polymers, Feb. 2015, Environmetnal Science and Pollution Research, vol. 22, pp. 7375-7404. (Year: 2015).*

* cited by examiner

*Primary Examiner* — Matthew O Savage
(74) *Attorney, Agent, or Firm* — Ladas & Parry LLP; Malcolm J. MacDonald

(57) ABSTRACT

A process for separate removal and recovery of heavy metals from industrial wastewater is provided. The wastewater to be treated flows through adsorbents after filtration and adjustment of a pH to about 3 to 7 to obtain the adsorbents which have adsorbed corresponding heavy-metal ions, which are then eluted from the corresponding adsorbents using an acidic solution such that eluates containing the corresponding heavy-metal ions are obtained.

8 Claims, 1 Drawing Sheet

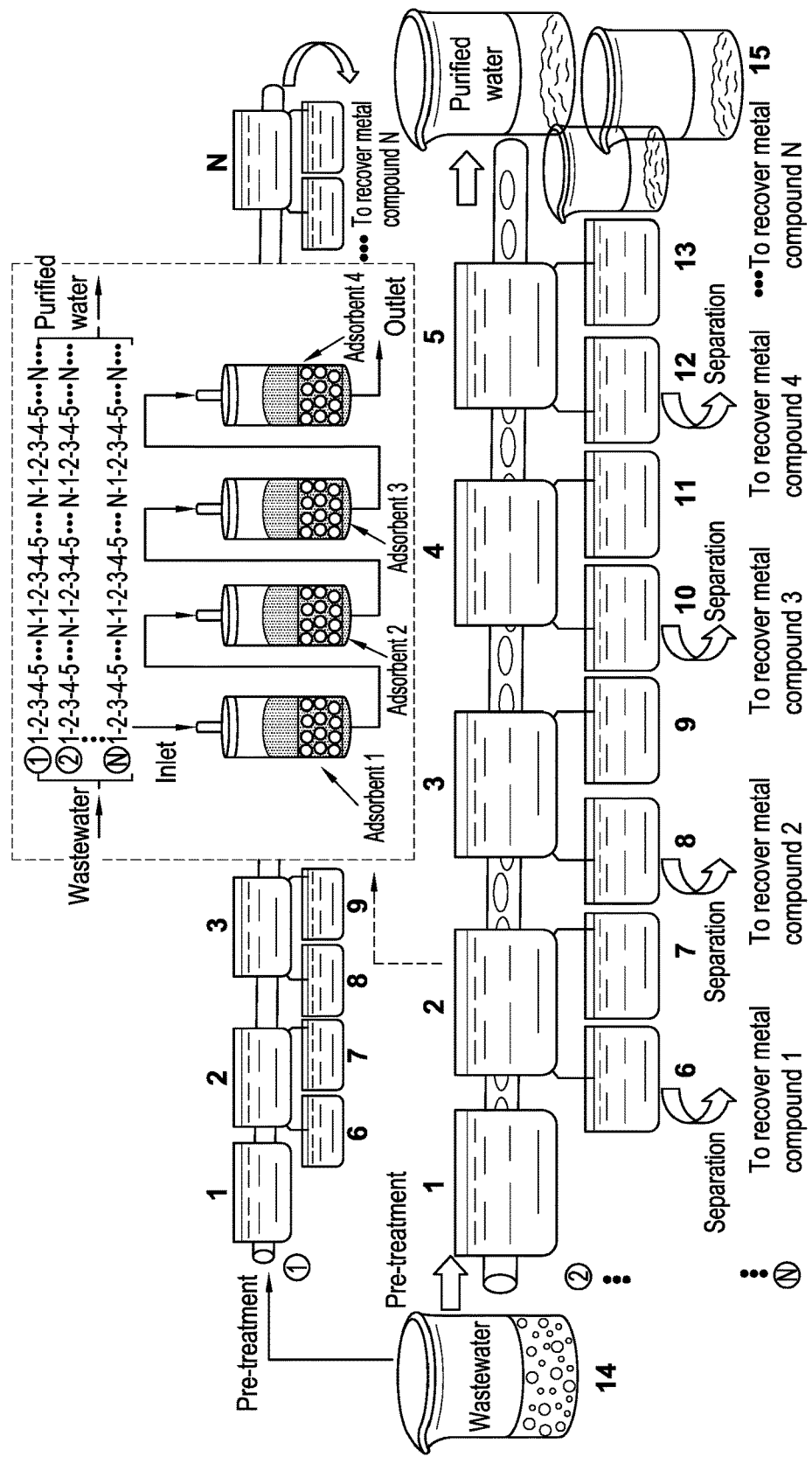

PROCESS FOR SEPARATE REMOVAL AND RECOVERY OF HEAVY METALS FROM INDUSTRIAL WASTEWATER

This application claims priority to Chinese application number 201610674248.5, filed Aug. 16, 2016, with a title of PROCESS FOR SEPARATE REMOVAL AND RECOVERY OF HEAVY METALS FROM INDUSTRIAL WASTEWATER. The above-mentioned patent application is incorporated herein by reference in its entirety.

TECHNICAL FIELD

The present invention relates to the technical field of treatment of heavy metals, in particular to a process for separate removal and recovery of heavy metals from industrial wastewater.

BACKGROUND

With the rapid development of the global industry, the life environment is gradually worsening, and especially the discharge of a large amount of wastewater containing heavy metals causes serious pollution for the environment. The heavy metals may be introduced into a human body through a food chain step by step and accumulate in the same continuously, and therefore have become serious threats to human health. The problem of how to efficiently achieve remediation of the water body containing heavy metals is currently a global concern.

Conventional methods for the purification of wastewater containing heavy metals mainly include chemical sedimentation, physical adsorption, biotreatment, ion exchange, membrane separation, micelle enhanced ultrafiltration, polymer complexed ultrafiltration, electrochemical method, etc. These conventional methods are disadvantageous in that they have a low selectivity for heavy metals and may cause secondary pollution, and therefore contrary to the removal and recovery of the heavy metals.

The concept for the treatment of industrial wastewater mainly focuses on the removal, recovery and reuse of the heavy metals. To achieve purification of a large amount of industrial wastewater such that discharge standards can be met and the heavy-metal ions can be separately recovered, an adsorbent is needed to be filled into a fixed bed. Although many small and medium enterprises facing a problem of serious heavy metal pollution have successively introduced adsorbent fixed-bed wastewater recycling devices, it is difficult for the prior art to remove heavy metals from the wastewater and separately recover highly pure heavy metals simultaneously due to that, in practice, the industrial wastewater contains a plurality of different kinds of metal ions and is complex in components.

SUMMARY

The objective of the invention is to provide a process for separate removal and recovery of heavy metals from industrial wastewater, which can achieve separate removal of the heavy metals from the industrial wastewater and obtain highly pure heavy metals.

To achieve the objective above, the invention provides a process for separate removal and recovery of heavy metals from industrial wastewater, comprising the steps of:

(a) adjusting the pH of the wastewater to a pH in the range of about 3 to 7 after filtration;

(b) discharging the wastewater obtained in said step (a) after flowing the wastewater through adsorbents to obtain the adsorbents which have adsorbed the corresponding heavy-metal ions; and (c) eluting the heavy-metal ions from the corresponding adsorbents obtained in said step (b) using an acidic solution such that eluates containing the corresponding heavy-metal ions are obtained.

Preferably, at least two different kinds of adsorbents, which adsorb different kinds of heavy-metal ions, are provided.

Preferably, the industrial wastewater obtained in said step (a) flows through the at least two different kinds of adsorbents in series.

Preferably, the number of the adsorbents of the same kind is at least 3.

Preferably, the wastewater obtained in said step (a) flows through a plurality of adsorption paths in parallel, and the number of the adsorption paths in parallel is at least 2.

Preferably, the adsorbents are ion-imprinted polymers.

Preferably, the acidic solution in said step (c) is a hydrochloric acid solution and/or a nitric acid solution.

Preferably, a ratio of the volume (ml) of the acidic solution to the mass (g) of the corresponding adsorbents is (100-150):(1-2), and a concentration of the acidic solution is about 0.1 to 1 mol/L.

Preferably, the temperature of the wastewater flowing through the adsorbents is about 15 to 55° C.

Preferably, a further step of separating each solute in each of said eluates from its solvent to obtain a corresponding heavy metal compound is performed.

According to the process of the invention, the pH of the industrial wastewater to be treated is adjusted to a pH in the range of about 3 to 7 after filtration. The wastewater then flows through adsorbents and is discharged, such that the adsorbents which have adsorbed corresponding heavy-metal ions are obtained. The heavy-metal ions are then eluted from the corresponding adsorbents using an acidic solution such that eluates containing the corresponding heavy-metal ions are obtained. Complete removal of solid particles from the industrial wastewater by means of filtration can inhibit a decrease in the adsorption efficiency due to that sufficient contact between the absorbents and the corresponding heavy-metal ions is prevented because of the solid particles blocking the adsorbents. Each adsorbent only adsorbs a specific heavy-metal ion, and the heavy-metal ions are then eluted from each adsorbent with an acidic solution. After this, the heavy metals can be then recovered through a subsequent separation process. Adjustment of the pH of the industrial wastewater to a pH in the range of about 3 to 7 can attenuate attack on the adsorbents from strongly acidic industrial wastewater. In this manner, the utilization rate of the adsorbents can be increased, and costs can thus be reduced.

An efficient adsorption to the different heavy metals can be achieved by flowing the industrial wastewater through different ion-imprinted polymers in series due to the selective adsorption of each ion-imprinted polymer to a specific heavy metal.

The number of the adsorbents of the same kind is at least 3 so as to enable complete adsorption to the corresponding heavy-metal ion to be achieved such that purification of the industrial wastewater can be achieved.

The industrial wastewater passes through a plurality of adsorption paths in parallel simultaneously so as to improve the adsorption efficiency.

The eluation rate can be up to 95% by eluting the heavy-metal ions from the corresponding adsorbents using a specified concentration of acidic solution. Therefore, an efficient recovery of heavy metals can be achieved and the utilization rate of the adsorbents can be increased, thus reducing costs.

BRIEF DESCRIPTION OF THE DRAWING

The present invention will further be described below in detail with reference to a drawing and embodiments.

FIG. 1 is a flowchart showing a process for separate removal and recovery of heavy metals from industrial wastewater according to the present invention.

DETAILED DESCRIPTION

A process for separate removal and recovery of heavy metals from industrial wastewater according to the present invention includes the steps of:

(a) adjusting the pH of the wastewater to a pH in the range of about 3 to 7 after filtration;

(b) discharging the wastewater obtained in said step (a) after flowing it through absorbents, to obtain the absorbents which have adsorbed the corresponding heavy-metal ions; and (c) eluting the heavy metal ions from the corresponding absorbents obtained in said step (b) using an acidic solution, such that eluates containing the corresponding heavy-metal ions are obtained.

With the process according to the present invention, complete removal of solid particles from the industrial wastewater by means of filtration can inhibit a decrease in the adsorption efficiency due to that sufficient contact between the absorbents and the corresponding heavy-metal ions is prevented because of the solid particles blocking the adsorbents. Each adsorbent only adsorbs a specific heavy-metal ion, and the heavy-metal ions are then eluted from each adsorbent with an acidic solution. After this, the heavy metals can be then recovered through a subsequent separation process. Adjustment of the pH of the industrial wastewater to a pH in the range of about 3 to 7 can attenuate attack on the adsorbents from strongly acidic industrial wastewater. In this manner, the utilization rate of the adsorbents can be increased, and costs can thus be reduced.

In step (a), after filtration, the pH of the industrial wastewater is adjusted to a pH in the range of about 3 to 7. Preferably, a grid is used to perform the filtration. Pores of the grid have an appropriate size such that the solid particles can be completely removed from the industrial wastewater.

Preferably, the industrial wastewater contains any one or more of $Cd^{2+}$, $Pb^{2+}$, $Hg^{2+}$, $Co^{2+}$, $Cu^{2+}$, $Ni^+$ and $Li^+$.

An alkali solution may be used as a pH adjusting agent to adjust the pH of the industrial wastewater. The concentration and amount of the alkali solution preferably depend on the initial and post-adjustment pH values. The alkali solution may be an aqueous solution of sodium hydroxide, ammonia or sodium carbonate. No special requirements have to be met by the source of the alkali solution, and any appropriate alkali solution known by those skilled in the art can be used.

The pH of the industrial wastewater may be adjusted to about 3 to 7, preferably about 3.5 to 6.5, and more preferably about 4 to 5.

After adjusting the pH of the industrial wastewater and then flowing it through the adsorbents, it is discharged and the adsorbents which have adsorbed the corresponding heavy-metal ions are obtained. A preferred temperature range of the wastewater flowing through the adsorbents is about 15 to 55° C., more preferably about 20 to 50° C., and most preferably about 30 to 40° C. The appropriate temperature of the wastewater flowing through the adsorbents can provide a reaction environment for the contact between the adsorbents and the corresponding heavy-metal ions so as to make the adsorption proceed smoothly.

A preferred flow rate of the wastewater flowing through the adsorbents is about 1 to 50 BV/h, more preferably about 5 to 45 BV/h and most preferably about 20 to 30 BV/h.

Preferably, at least two different kinds of adsorbents are used. The different kinds of adsorbents preferably adsorb different kinds of heavy-metal ions. The wastewater preferably flows through the at least two different kinds of adsorbents in series. The number of the kinds of the adsorbents preferably is the same as that of the heavy-metal ions to be adsorbed. The number of the adsorbents of the same kind is preferably at least 3, and more preferably 4 or 5. The adsorbents are preferably those that have the ability to selectively identify the corresponding heavy-metal ions to be adsorbed, and the kinds of the adsorbents are preferably consistent with those of the heavy-metal ions to be adsorbed.

The adsorbents are preferably ion-imprinted polymers. The ion-imprinted polymers with different heavy-metal ions may be set for different adsorbed objects. Preferably, a method for preparing the ion-imprinted polymers may include the following steps:

(i) mixing a functional monomer, a template ion, a methanol aqueous solution, a crosslinking agent and an initiator to form a mixed solution;

(ii) removing oxygen from the mixed solution and then warming it to about 60 to 70° C., to obtain a polymer with the template ion; and (iii) removing the template ion from the polymer obtained in said step (ii) to form the ion-imprinted polymer.

In embodiments of the methanol aqueous solution of the invention, the methanol/water ratio (volume ratio) is preferably about 4 to 6, and more preferably about 4.5 to 5.5.

The molar ratio of the functional monomer to the template ion is preferably about 2 to 4, and more preferably about 2.5 to 3.5.

Preferably, the heavy-metal ion in the industrial wastewater to be adsorbed is selected as the template ion.

In embodiments of the invention, the functional monomer may be methacrylic acid, 3-allylrhodanine, 2-(allylthio) nicotinic acid or 2-(allyloxy)methyl-12-crown-4 (2AM124). No special requirements have to be met by the source of the functional monomer, and any appropriate functional monomer known by those skilled in the art can be used.

The functional monomer of 2-(allyloxy)methyl-12-crown-4 (2AM124) above may be synthesized according to a following example. Potassium hydride (30% dispersion in mineral oil, 0.32 g, 9 mmol) was mixed with 2-methylol-12-crown-4 (2M12C4, 0.40 g, 1.94 mmol) in DMF at room temperature for 30 min. Then, allyl bromide (1.22 g, 10.1 mmol) was added, and the reaction mixture was stirred overnight. The reaction was quenched with methanol. Following this, the reaction mixture after the reaction was then evaporated under a reduced pressure. The evaporated reaction mixture was extracted with $CH_2Cl_2$. The extract obtained was washed with water for three times (3*100 mL), dried with $MgSO_4(s)$, and filtered. The filtrate was concentrated on a rotary evaporator to provide a solid which was then purified by column chromatography ($SiO_2$, hexane/EtOAc1:2) to obtain the final product. The measured $^1H$ chemical shifts of this product in the $^1H$-NMR spectrum (in DMSO-d6) were 5.89-5.82 (m, 1H), 5.22 (d, J=15.6, 1H), 5.16 (d, J=26.8, 1H), 3.91 (d, J=5.2 2H) and 3.67-3.32 (m, 17H), respectively. The measured $^{13}$C chemical shifts of this product in the $^{13}$C-NMR spectrum (in DMSO-d6) were 135.16, 116.23, 77.81, 71.25, 70.99, 70.37, 70.07, 69.98, 69.89, 69.70, and 69.38, respectively. From these results, it was suggested that the objective product was obtained.

The crosslinking agent is preferably ethylene glycol dimethacrylate, and the initiator is preferably azobisisobutyronitrile. No special requirements have to be met by the source of the crosslinking agent or the initiator, and any appropriate one known by those skilled in the art can be used.

No special requirements have to be met by the manner of oxygen removal, any appropriate manner known by those skilled in the art can be used. According to the invention, a preferred manner of oxygen removal is to introduce an inert gas into the mixed solution. In one embodiment of the invention, nitrogen is selected as the inert gas to be introduced into the mixed solution. The time required to complete the introduction of nitrogen is preferably about 30 to 45 min, and more preferably about 35 to 40 min.

The reaction may be performed with stirring using a stirring magnet. A rotating speed of the stirring magnet is preferably about 20 to 40 rpm, and more preferably about 25 to 35 rpm.

A temperature rising rate is preferably about 0.5 to 0.8° C./min, and more preferably about 0.55 to 0.6° C./min.

The reaction is terminated after a reaction time of preferably about 20 to 24 h, more preferably about 22 to 23.5 h.

No special requirements have to be met by the method for removal of the template ion, any appropriate method known by those skilled in the art can be used. According to the invention, a preferred method for removal of the template ion includes sequential steps of alcohol washing, water washing, acid pickling, second water washing, and drying. As to the alcohol washing step, the polymer with the template ion may be soaked in a methanol solution with a methanol concentration of not less than 95% for preferably about 5 to 10 min, and the number of repetitions of the alcohol washing is preferably 5 to 7 times.

Following this alcohol washing step, the polymer with the template ion is preferably washed with deionized water. A preferred washing time for this is about 2 to 4 min. No special requirements have to be met by the source of the deionized water, any appropriate deionized water known by those skilled in the art can be used. The number of repetitions of the water washing is preferably 5 to 7 times.

A solution of hydrochloric acid or nitric acid at a concentration of about 1 to 2 mol/L is preferably used to perform the acid pickling for the polymer with the template ion after completion of the water washing. A preferred time for the acid pickling is about 10 to 15 min so as to sufficiently remove the template ion from the polymer. Preferably, a step of ion detection is performed for the filtrate, and the optimal detection result is that no ion is detected.

As to the second water washing step, deionized water is preferably used to remove residual hydrochloric acid or nitric acid solution from the polymer. The second water washing is performed for an appropriate period such that the pH of the polymer is neutral.

The drying step can be performed by any known manner, such as freeze-drying or vacuum drying. When the polymer is freeze-dried, its temperature may be decreased to about 0 to 5° C. by means of any method known by those skilled in the art, and this freeze-drying step is preferably performed for a period during which no change occurs in the quality of the polymer; when the polymer is dried under vacuum, any appropriate vacuum drying method known by those skilled in the art can be used, and the temperature is preferably about 40 to 45° C. and the vacuum is preferably about 2.5 to 7 Pa.

When at least two different kinds of adsorbents are used, the wastewater preferably flows through the at least two different kinds of adsorbents in series. The number of the adsorbents of the same kind is at least 3 such that the wastewater can flow through the adsorbents of the same kind at least 3 times, achieving sufficient adsorption to the corresponding heavy-metal ions and thus reducing contents of the heavy metals in the industrial wastewater to be discharged. Therefore, the discharge standards can be satisfied, and the purification of the industrial wastewater can thus be achieved.

Preferably, the wastewater flows through a plurality of adsorption paths in parallel. The number of the adsorption paths in parallel is preferably at least 2, and more preferably 4 to 6. Each adsorption path may be implemented in the manner described above.

The adsorbents according to the invention preferably are filled into corresponding fixed beds. Preferably, each adsorbent is present in an amount that is enough to make the corresponding fixed bed full. No special requirements have to be met by the source of the fixed beds, any appropriate fixed bed known by those skilled in the art can be used.

After obtaining the adsorbents which have adsorbed the corresponding heavy-metal ions, the latter are eluted with an acidic solution to obtain eluates containing the corresponding heavy-metal ions. Preferably, the step of elution is preceded by a step of measuring contents of the heavy metals adsorbed to the corresponding adsorbents. No special requirements have to be met by the measurement method, any appropriate method known by those skilled in the art can be used. However, in embodiments of the invention, the measurement methods preferably are ultraviolet & visible spectrophotometry, atomic adsorption, atomic fluorescence spectrometry (AFS), inductively coupled plasma optical emission spectrometry (ICP-OES), x-ray fluorescence spectrometry or inductively coupled plasma mass spectroscopy (ICP-MS).

The time required to elute the heavy-metal ions from the corresponding adsorbents is preferably about 10 to 15 min, and more preferably about 12 to 13 min. This elution may be performed at intervals of about 1 to 1.5 h. The number of times of eluting each heavy-metal ion from the corresponding adsorbent is determined according to whether the heavy metals adsorbed to the corresponding adsorbents are completely recovered. Preferably, the number of times of eluting each heavy-metal ion from the corresponding adsorbent is 5 to 7. No special requirements have to be met by the specific steps of the elution process, any appropriate specific steps known by those skilled in the art can be taken.

A ratio of the volume (ml) of the acidic solution to the mass (g) of the corresponding adsorbent is preferably (100-150):(1-2), and more preferably 120:(1-2). The concentration of the acidic solution is preferably about 0.1 to 1 mol/L, more preferably about 0.2 to 0.3 mol/L. It should be noted that the concentration of the acidic solution cannot be so high that the acidic solution causes dissolution loss and collapse of frameworks of the adsorbents, and also it cannot be so low that the complete elution of the heavy metals adsorbed to the corresponding adsorbents cannot be achieved, resulting a poor eluting effect.

Preferably, the acidic solution is a hydrochloric acid aqueous solution or a nitric acid aqueous solution. No special requirements have to be met by the source of the hydrochloric acid aqueous solution or the nitric acid aqueous solution, any appropriate one known by those skilled in the art can be used.

After obtaining the eluates, preferably, each solute in each eluate is then separated from its solvent to obtain a corresponding heavy metal compound. These heavy metal compounds are preferably heavy metal chlorides or heavy metal nitrates. The solutes are preferably separated from the corresponding solvents by one or more of evaporation, distillation, crystallization and precipitation. No special requirements have to be met by the specific procedures of the evaporation, the distillation, the crystallization or the precipitation, any appropriate one(s) known by those skilled in the art can be used.

After obtaining the heavy metal compounds, preferably, the content of each heavy metal in each compound is measured. No special requirements have to be met by the measurement methods, any appropriate method known by those skilled in the art can be used. However, in embodiments of the invention, the measurement methods preferably are ultraviolet & visible spectrophotometry, atomic adsorption, atomic fluorescence spectrometry (AFS), inductively coupled plasma optical emission spectrometry (ICP-OES), x-ray fluorescence spectrometry or inductively coupled plasma mass spectroscopy (ICP-MS).

Preferably, a relation of the contents of the heavy metals adsorbed to the corresponding adsorbents to the measured contents of the same in the corresponding compounds is represented by an elution rate, which, according to the invention, is higher than 95%. The high elution rate ensures that the adsorbents can be reused 5-6 times and costs thus can be reduced.

FIG. 1 shows a preferred process for separate removal and recovery of heavy metals from industrial wastewater according to the present invention. As shown in this FIGURE, a plurality of adsorption paths in parallel are provided so as to improve the adsorption efficiency. The number of the paths may be 2, 3, 4 or more. Each adsorption path consists of a plurality of groups, in series, of fixed beds filled with the adsorbents, such as a tank 1, a tank 2, a tank 3, a tank 4, a tank 5, and a tank N shown in this FIGURE. Provision of the plurality of groups of the fixed beds can improve adsorption efficiency of the adsorbents for the heavy metals in the industrial wastewater and thus result in a decrease in the impact on the environment. The number of the groups of the fixed beds may be 2, 3, 4 or more. Each group of the fixed beds consists of a plurality of fixed beds in series, each of which is filled with a different adsorbent so as to enable adsorption of different kinds of heavy metals to be achieved. Therefore, the number of the fixed beds in each group corresponds to that of the different kinds of heavy metals to be adsorbed. After the industrial wastewater flowing through the fixed beds, eluates obtained by eluating the heavy metals adsorbed to the corresponding adsorbents filled in the fixed beds are introduced into the corresponding eluate tanks next to the respective fixed beds, such as a tank 6, a tank 7, a tank 8, a tank 9, a tank 10, a tank 11, a tank 12 and a tank 13 shown in this FIGURE. Separations of the eluates are performed in the corresponding eluate tanks to obtain corresponding heavy metal compounds.

The process for separate removal and recovery of heavy metals from industrial wastewater according to the invention will now be further described below with reference to examples, which should not be construed as limiting the scope of the invention.

Example 1

Industrial wastewater containing $Pb^{2+}$, $Cd^{2+}$, $Co^{2+}$ and $Li^+$ was treated. After the wastewater was filtered with a grid having a pore diameter of about 5 μm to remove solid particles therein, a solution of 5 mol/L aqueous sodium hydroxide was added to adjust the pH to about 7. The wastewater was then introduced into two adsorption paths in parallel at a flow rate of 50 BV/h. Each path consisted of five groups of fixed beds in series, and each group consisted of a plurality of fixed beds filled with a lead ion imprinted polymer, a cadmium ion imprinted polymer, a cobalt ion imprinted polymer and a lithium ion polymer respectively. Both sides of each group of the fixed beds were equipped with corresponding eluate tanks. After the wastewater flowing through the fixed beds, it flowed into a purified water tank. A detection of heavy-metal ions was performed for the water in the purified water tank. The detection result showed that the purified water satisfied discharge standards. Detection results of the heavy-metal ions for the industrial wastewater before and after treatment were listed in Table 1.

A detection of the heavy metal contents was performed using atomic adsorption for the corresponding adsorbents in the respective fixed beds which have finished the adsorption to the corresponding heavy metals. A solution of 0.1 mol/L hydrochloric acid solution was then added to accomplish elution for each fixed bed. A ratio of the volume (ml) of the hydrochloric acid solution to the mass (g) of the corresponding adsorbents in each fixed bed was 150:1. Eluates obtained by this way then flowed into the corresponding eluate tanks. Following this, each eluate in each eluate tank was separated by means of evaporation to obtain a corresponding heavy-metal chloride. A detection of the heavy metal contents was also performed using the atomic adsorption for the heavy-metal chlorides obtained. A relation of the contents of the heavy metals adsorbed to the corresponding adsorbents in the respective fixed beds to those of the heavy metals in the corresponding heavy-metal chlorides obtained was represented by an elution rate. It was determined that each elution rate was higher than 95%.

By detecting the contents of the heavy metals in each heavy-metal chloride obtained, it was found that, the final heavy-metal ion purity was 96%. The lead ion imprinted polymer filled in the corresponding fixed beds was prepared according to the following steps:

i. following addition of 100 mL of methanol aqueous solution (methanol/water=4:1 (by volume)) into a 250 mL one-neck round bottom flask, with stirring, 1.4 mmol of methacrylic acid and 0.7 mmol of lead ion were then added successively and the mixture was stirred for 30 min at room temperature;

ii. after the solid was completely dissolved, following addition of 7.5 mmol of ethylene glycol dimethacrylate and 0.33 mmol of azobisisobutyronitrile, nitrogen was introduced into the mixture for 30 min to remove oxygen dissolved in it and the flask was then sealed;

iii. the contents was then placed in an oil bath and stirred magnetically at a speed of 20 rpm, with the same warmed from room temperature to 70° C. in a period of about 2 h and stirred for a further 24 h; after the completion of the reaction, a suction filtration was performed for the products with the same washed 5 times using methanol and a further 5 times using water; and iv. the target ion was eluted from the polymer using 1 mol/L HCl until the presence of the lead ion in the filtrate cannot be detected, and the polymer was then repeatedly washed with deionized water up to neuter pH of the washing water after washing and further, following separation, freeze dried to constant weight.

The chromium ion imprinted polymer, the cobalt ion imprinted polymer and the lithium ion imprinted polymer are prepared similarly to the lead ion imprinted polymer. The lead ion is required to be changed into chromium ion, cobalt ion and lithium ion respectively, and the methacrylic acid is required to be changed into 3-allylrhodanine, 2-(allylthio) nicotinic acid and 2-(allyloxy)methyl-12-crown-4 (2AM124) respectively.

TABLE 1

Contents of the heavy metals in the industrial wastewater before and after treatment

| Contents of the heavy metals in the industrial wastewater before treatment | | | | Contents of the heavy metals in the industrial wastewater after treatment | | | |
|---|---|---|---|---|---|---|---|
| $Cd^{2+}$ | $Pd^{2+}$ | $Co^{2+}$ | $Li^+$ | $Cd^{2+}$ | $Pd^{2+}$ | $Co^{2+}$ | $Li^+$ |
| 2.5 g/L | 50 mg/L | 110 mg/L | 4 g/L | 0.1 mg/L | 0.2 mg/L | 0.1 mg/L | 1 mg/L |

From the results shown in Table 1, it was apparent that, after treatment by the process according to the invention, the contents of the heavy metals in the industrial wastewater were substantively reduced, and purification of the industrial wastewater was thus achieved.

Example 2

Industrial wastewater containing $Pb^{2+}$, $Cd^{2+}$, $Co^{2+}$ and $Li^+$ was treated. After the wastewater was filtered with a grid having a pore diameter of about 5 μm to remove solid particles therein, a solution of 5 mol/L aqueous sodium hydroxide was added to adjust the pH to about 3. The wastewater was then introduced into three adsorption paths in parallel at a flow rate of 50 BV/h. Each path consisted of three groups of fixed beds in series, and each group consisted of a plurality of fixed beds filled with a lead ion imprinted polymer, a chromium ion imprinted polymer, a cobalt ion imprinted polymer and a lithium ion polymer respectively. These polymers were prepared according to the method in Example 1. Both sides of each group of the fixed beds were equipped with corresponding eluate tanks. After the wastewater flowing through the fixed beds, it flowed into a purified water tank. A detection of heavy-metal ions was performed for the water in the purified water tank. The detection result showed that the purified water satisfied discharge standards.

A detection of the heavy metal contents was performed using atomic adsorption for the corresponding adsorbents in the respective fixed beds which have finished the adsorption to the corresponding heavy metals. A solution of 1.0 mol/L hydrochloric acid solution was then added to accomplish elution for each fixed bed. A ratio of the volume (ml) of the hydrochloric acid solution to the mass (g) of the corresponding adsorbents in each fixed bed was 100:1. Eluates obtained by this way then flowed into the corresponding eluate tanks. Following this, each eluate in each eluate tank was separated by means of precipitation to obtain a corresponding heavy-metal chloride. A detection of the heavy metal contents was also performed using the atomic adsorption for the heavy-metal chlorides obtained. A relation of the contents of the heavy metals adsorbed to the corresponding adsorbents in the respective fixed beds to those of the heavy metals in the corresponding heavy-metal chlorides obtained was represented by an elution rate. It was determined that each elution rate was higher than 95%.

The descriptions above are just preferred embodiments of the invention, it will be apparent to those skilled in the art that various modifications and variations can be made without departing from the spirit or scope of the invention.

What is claimed is:

1. A process for separate removal and recovery of heavy metals from industrial wastewater, comprising the steps of:
   (a) adjusting the pH of the wastewater to a pH in the range of about 3 to 7 after filtration;
   (b) discharging the wastewater obtained in said step (a) after flowing the wastewater through adsorbents to obtain the adsorbents which have adsorbed the corresponding heavy-metal ions; and
   (c) eluting the heavy-metal ions from the corresponding adsorbents obtained in said step (b) using an acidic solution such that eluates containing the corresponding heavy-metal ions are obtained;
   wherein the heavy metals are $Cd^{2+}$, $Pd^{2+}$, $Co^{2+}$, and $Li^+$;
   wherein the adsorbents comprise lead ion imprinted polymers, cadmium ion imprinted polymers, cobalt ion imprinted polymers, and lithium ion polymers;
   wherein the method for preparing ion imprinted polymers includes the following steps:
   (i) mixing a functional monomer, a template ion, a methanol aqueous solution, a crosslinking agent, and an initiator to form a mixed solution;
   wherein the functional monomer is selected from the group consisting of methacrylic acid, 3-allylrhodanine, 2-(allylthio)nicotinic acid, and 2-(allyloxy)methyl-12-crown-4;
   (ii) removing oxygen from the mixed solution and then, after the oxygen removal, warming the mixed solution to about 60 to 70° C., to obtain a polymer with the template ion; and
   (iii) removing the template ion from the polymer obtained in said step (ii) to form the ion-imprinted polymer.

2. The process of claim 1, wherein the industrial wastewater obtained in said step (a) flows through at least two different kinds of adsorbents in series.

3. The process of claim 1, wherein the number of the adsorbents of the same kind is at least 3.

4. The process of claim 1, wherein the wastewater obtained in said step (a) flows through a plurality of adsorption paths in parallel, and the number of the adsorption paths in parallel is at least 2.

5. The process of claim 1, wherein the acidic solution in said step (c) is a hydrochloric acid solution and/or a nitric acid solution.

6. The process of claim 1, wherein a ratio of the volume (ml) of the acidic solution to the mass (g) of the corresponding adsorbents is (100-150):(1-2), and a concentration of the acidic solution is about 0.1 to 1 mol/L.

7. The process of claim 1, wherein the temperature of the wastewater flowing through the adsorbents is about 15 to 55° C.

8. The process of claim 1, wherein a further step of separating each solute in each of said eluates from its solvent to obtain a corresponding heavy metal compound is performed.

* * * * *